United States Patent [19]

Breithaupt

[11] Patent Number: 4,938,589
[45] Date of Patent: Jul. 3, 1990

[54] SENSOR WITH INTEGRATED SIGNAL PROCESSING FOR ONE- TO THREE-DIMENSIONAL POSITIONING

[75] Inventor: Hans-Hellmut Breithaupt, Kassel, Fed. Rep. of Germany

[73] Assignee: F. W. Breithaupt & Sohn GmbH & Co. KG., Kassel, Fed. Rep. of Germany

[21] Appl. No.: 145,864

[22] Filed: Jan. 20, 1988

[30] Foreign Application Priority Data

Feb. 9, 1987 [DE] Fed. Rep. of Germany ....... 3703904

[51] Int. Cl.⁵ .................... G01C 1/00; G01C 1/10; G01D 5/36
[52] U.S. Cl. ............................. 356/1; 356/4; 356/149; 356/152; 356/250; 33/283; 250/233; 250/237 R
[58] Field of Search .................. 356/485, 1, 4, 141, 356/152, 149, 250; 250/237 R, 233; 354/403; 33/283

[56] References Cited

U.S. PATENT DOCUMENTS

| | | | |
|---|---|---|---|
| 2,552,890 | 5/1951 | Eisler | 250/201 X |
| 3,435,213 | 3/1969 | Colbow et al. | 250/233 X |
| 3,544,221 | 12/1970 | Putnam | 356/4 X |
| 3,617,131 | 11/1971 | Taguchi | 356/149 X |
| 3,746,842 | 7/1973 | Fowler | 377/39 X |
| 3,895,870 | 7/1975 | Cullen et al. | 356/1 |
| 4,181,430 | 1/1980 | Shirota et al. | 356/1 |
| 4,193,689 | 3/1980 | Reymond et al. | 356/152 |
| 4,319,838 | 3/1982 | Grossman et al. | 356/152 |
| 4,470,681 | 9/1984 | Johnson | 354/403 |
| 4,522,492 | 6/1985 | Masunaga | 356/1 |
| 4,529,304 | 7/1985 | Ogawa et al. | 356/1 |
| 4,781,465 | 11/1988 | Demachi et al. | 356/4 X |

FOREIGN PATENT DOCUMENTS

| | | | |
|---|---|---|---|
| 0224686 | 7/1985 | German Democratic Rep. | 356/1 |
| 0717530 | 2/1980 | U.S.S.R. | 33/283 |

Primary Examiner—Thomas H. Tarcza
Assistant Examiner—Linda J. Wallace
Attorney, Agent, or Firm—Helfgott & Karas

[57] ABSTRACT

The sensor comprises a radiation source (2), optical elements (5), a pattern generator (4), and a sensor field (3) which includes a plurality of distinguishable, measurable points. The pattern generator (4) changes the beam reflected from an object (8), imaging a pattern on the sensor field (3). An evaluator means (6) samples the individual distinguishable, measurable points of the sensor field and determines the measurement variable on that basis.

15 Claims, 8 Drawing Sheets

SENSOR WITH INTEGRATED SIGNAL PROCESSING FOR ONE- TO THREE-DIMENSIONAL POSITIONING

FIELD OF THE INVENTION

The invention relates to a sensor with integrated signal processing for one- to three-dimensional positioning, comprising a housing, a radiation source, especially a light source arranged inside the housing, and an evaluator means.

BACKGROUND OF THE INVENTION

Known optical or optoelectronic sensors measure distances by measuring the transit time of light pulses or by comparing the phases of light beams, usually modulated light beams transmitted by the sensor to the object where they are reflected and then compared as to their phase positions with a reference light beam. The methods applied with the known measuring instruments are called "active" because part of the measuring means, usually a mirror must be mounted on the object to be measured.

In practice, therefore, the application of these known methods is limited because normally, prior to taking a measurement, the object to be measured must be approached and that can be quite troublesome in rough terrain.

SUMMARY OF THE INVENTION

It is, therefore, an object of the instant invention to improve a sensor of the generic kind question such it requires no sensor elements to be attached to the respective object to be measured.

This object is met, in accordance with the invention, in that a beam from the radiation source is directed on a pattern generator by way of optical elements the spacing or location of which is defined with respect to the radiation source, the beam possibly having been reflected at an object, and being passed on from the pattern generator to a sensor field which includes a plurality of distinguishable, measurable points, and in that the evaluator means is connected to the sensor field and determines the desired measurement variables in response to the electrical state of the measurable points.

The essential concept underlying the invention is to be seen in the provision of a pattern generator between optical elements which, symbolically speaking, "see" the (light) beam emitted by the sensor as it impinges on the object and a sensor field in which the point of incidence of light on the object is imaged. This pattern generator projects diffusely reflected light of the measuring beam as a pattern (e.g. a fine line) on the sensor field. The pattern generator may be embodied by a simple diaphragm. An optical system likewise may be used which comprises different lenses, for instance also cylindrical lenses as well as diaphragms. In principle, the configuration of the pattern created by the pattern generator may be as desired and is not limited to the line mentioned.

For certain fields of application, the pattern generator may be movable, as will be explained in greater detail in the description of an embodiment of the invention.

The sensor according to the invention, among others, may be used to measure distances, angles, heights, positions, and shapes of articles as well as inclinations of objects, angles and directions with reference to Magnetic North, volumes, filling levels, and profiles of articles.

BRIEF DESCRIPTION OF THE DRAWING

The invention will be described further, by way of example, with reference to the accompanying drawings, in which.

DESCRIPTION OF THE PREFERRED EMBODIMENTS

Figure 1:
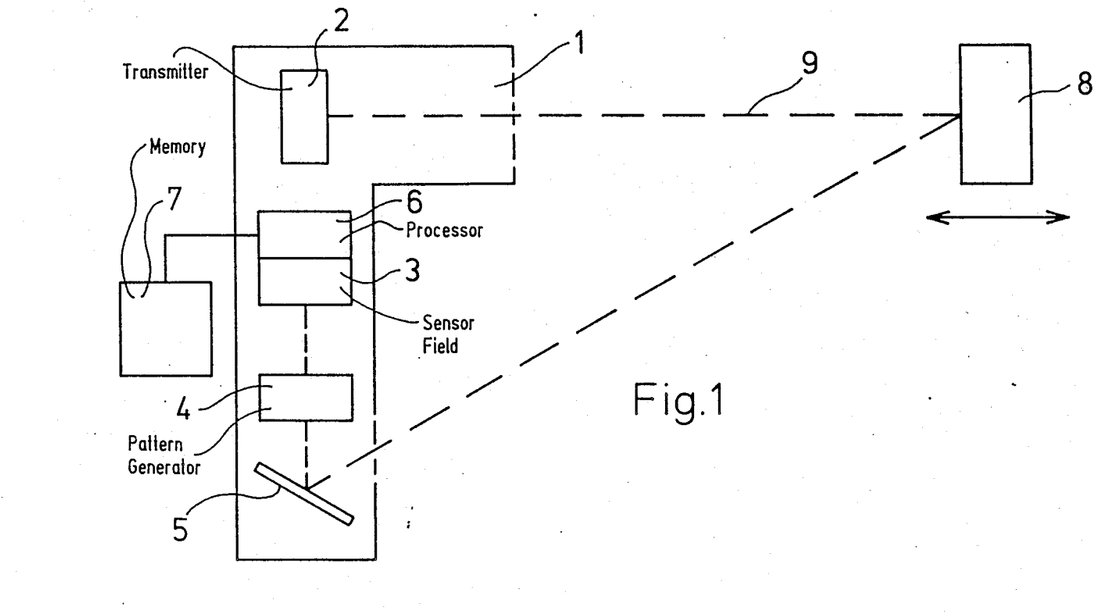
FIG. 1 is a diagrammatic sketch of the sensor when used to measure distances.

FIG. 1 shows the sensor which comprises a transmitter 2 located in a housing 1 and transmitting a measuring beam 9 in fixed direction. The measuring beam preferably is a light beam having a very small diameter, such as a laser beam. The wavelength of the light may be as desired and may comprise a wide spectrum. However, preferably the wavelength of the light beam is strictly limited, for instance, to the infrared range, or even monochromatic light is used.

The measuring beam 9 impinges on an object 8 where it forms a light spot or light dot. The diffusely reflected light from the object 8 is directed by an optical element 5 mounted firmly inside the housing 1 and being, for example, a mirror or a prism, on to a pattern generator 4. This pattern generator 4 transforms the light it receives from the optical element 5 in a certain manner and images it as a pattern on a sensor field 3. In a simple case, the pattern generator 4 is a slit diaphragm which transforms the image of a light dot into a fine, straight line (pattern).

The sensor field 3 contains a plurality of photosensitive, distinguishable measuring dots provided in a row or in a matrix arrangement. Up to a few 100,000 measuring points may be provided, depending on the desired resolution capability. The individual measuring points may be sampled electronically by a signal processing means 6. The relative position of the sensor points illuminated in the sensor field by the imaged pattern then may be used by the signal processing means 6 to calculate the desired measurement result, for instance the distance between the transmitter 2 and the object 8. The sensor field 3 preferably consists of a CCD (charge coupled device) array in which a multitude of discrete measuring points lie close to one another. This provides a very good resolution capability for the measurement.

A memory 7 may be connected to the signal processing means 6, as shown. Instead of a storage means, an output unit may be provided, such as an LED-type or LC-display.

The mode of operation of the sensor shown in FIG. 1 will be explained with reference to FIG. 2.

The distance D between the sensor and the object 8 is to be determined. The respective position in space between the light source 2, the sensor field 3, and the optical element 5 is known, the distance between the center of the optical element 5 and the light source being assumed to be $l_1$ and the distance between the optical element 5 and the imaging surface of the sensor field 3 being $l_2$. The optical element 5 is assumed to be a mirror positioned at an angle (of e.g. 45°) with respect to the central axis 10 of the sensor. The light beam 9 is emitted precisely at right angles with respect to the axis 10. The light beam reflected by the object 8 and incident on the center of the mirror 5 extends at angle $\alpha$ with respect to the light beam 9 emitted by the transmitter 2. The mirror 5 directs this beam through the pattern generator 4 on the sensor field 3. And this latter beam also includes angle $\alpha$ with the central axis 10 because of the orientation which the mirror is given. In this manner a photosensitive point is irradiated in the sensor field 3 which point is located at the distance $l_3$ from the central axis 10.

Starting from these given geometric conditions, the following relationships may be established:

$$\tan \alpha = l_1/D = l_3/l_2.$$

Consequently, $l_3$, in other words the distance of the illuminated measuring point in the sensor field 3 is inversely proportional to the measuring variable D which is looked for, multiplied by a factor ($l_1 \times l_2$).

If one changes the orientation of the mirror 5 with respect to the central axis 10, of course, also the equations indicated will change. It presents absolutely no problem to the person skilled in the art to draft the correct trigonometrical relations for such cases too.

Figure 2:
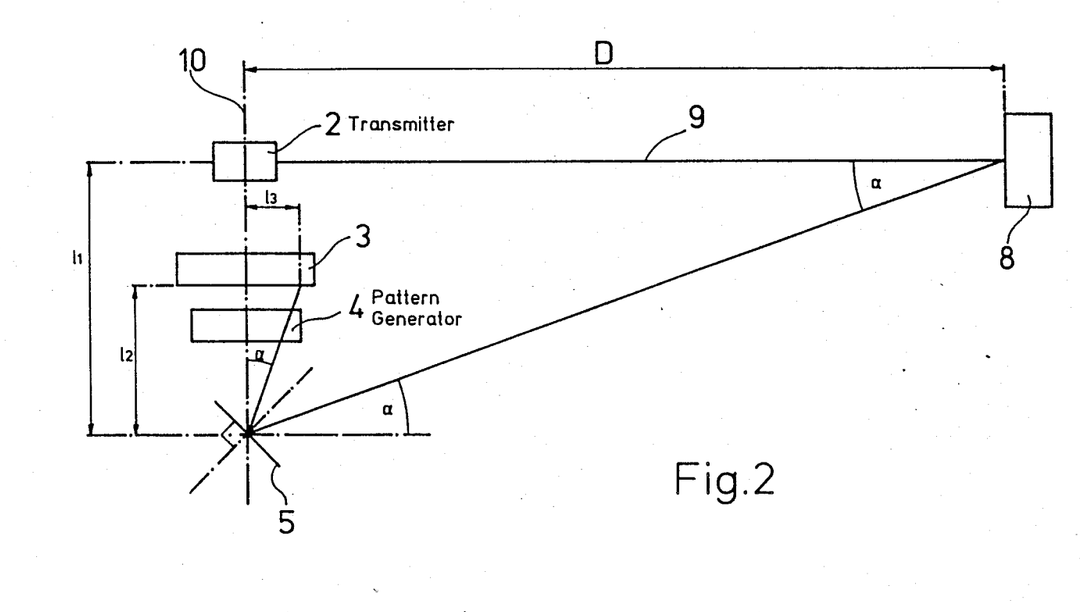
FIG. 2 is a diagrammatic sketch to explain the working principle of the sensor shown in FIG. 1.

As it is, in the final analysis, the parallax error (angle $\alpha$) which is evaluated by the sensor according to FIG. 2, the capability of resolution, of course, becomes the better the greater $l_1$ and $l_2$ are. Moreover, the resolution capability naturally depends on the number and mutual spacing of the individual measurable points in the sensor field 3. In present day commercial arrays distinguishable, measurable points are provided at spacings in the micrometer range. Under this aspect, therefore, the resolution capability available is sufficient for most measuring purposes.

In CCD arrays which are avaible commercially at present the spacing between centers of two adjacent measuring points is approximately 13 μm. If the distance $l_2$ is set at 40 cm, the resolution capability with respect to variations of the angle ($\alpha$) is $1.862 \times 10^{-3}$. If distances in the order of 10 m are to be measured, a change in angle by this value corresponds to a change in length D of approximately 8.13 mm.

The resolution capability can be improved still further by the pattern generator 4. If the pattern generator 4 transforms the light spot imaged in the center of the mirror 5 into a narrow line, and if the pattern generator is given such orientation that this line extends obliquely with respect to the main axes (X,Y) of the two-dimensional sensor field, this measure is apt to improve the resolution capability by one or more powers of ten, similar to a vernier scale.

In this case a matrix is used instead of an arrangement in lines, and the pattern generator 4 transforms the light dot into a fine line which is disposed obliquely with respect to the matrix of measuring points. In this manner the capability of resolution is greatly enhanced because any parallel displacement of the imaged pattern by amounts which are distinctly smaller than the spacing between centers of adjacent measuring points will bring about an illumination of a different combination of measuring points. If, for instance, one takes a sensor having $10 \times 10 = 100$ sensitive measuring points and positions the fine "line" which is imaged in the sensor field such that the first measuring point of a line is connected to the last measuring point of the next line, only the two measuring points in question will be illuminated. Now, if the fine "line" is displaced by one tenth of the spacing between centers of adjacent measuring points (e.g. in the direction of the Y-axis to the top), the penultimate measuring point of the upper line or row will be illuminated, while no measuring point in the lower line or row will remain illuminated. In the case of a $10 \times 10$ matrix, therefore, the capability of resolution may be enhanced fourteen times. If a sensor is used which has $500 \times 500$ measuring points, this method affords an improvement of five hundred times of the capability of resolution. It is a prerequisite that the very small angle of rotation can be adjusted with respect to the principal axes of the sensor field. If the angle of rotation is selected twice as big, the capability of resolution will be reduced to 250 times.

The optical elements 5 in addition may include a lens system in front of the mirror, as seen in the direction of the incident beam, for imaging the image of the object on the pattern generator 4 and/or the sensor field 3. Furthermore, filters may be provided permitting passage only of certain wavelength portions of the radiation, such as infrared light in the case of infrared radiation. This eliminates disturbing light portions so that all that can be "seen" from the sensor field is the light dot of the radiation 9 on the object 8. This also demonstrates that no active element, such as a mirror need be attached to the object because even a diffusely scattered beam or light spot is imaged on the pattern generator 4.

Figure 3:
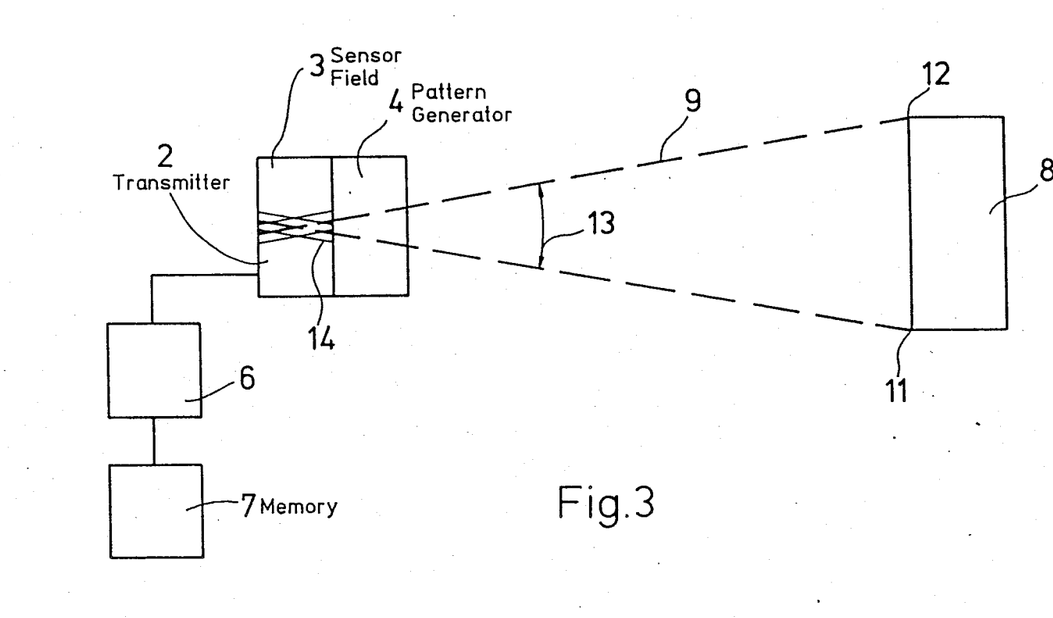
FIG. 3 is a diagrammatic sketch of the sensor for measuring angles.

FIG. 3 is a diagrammatic presentation of an embodiment of a sensor for measuring angles. In the case of one embodiment of the invention the sensor comprises two transmitters the measuring beams 9 of which each are directed at a point 11 or 12 between the two of which the angle 13 is to be measured. During the measurement, the housing of the sensor is maintained in fixed position, while the two transmitters may be pivoted with respect to the housing. The pattern generator 4 then generates two patterns in the sensor field 3, the relative positions thereof in the sensor field being an indication of the angle 13 to be measured. Again, the "excited" points of the sensor field 3 are sampled by the signal processing means 6, the coordinates thereof or the values already transformed by a mathematical function, if desired, being filed in the memory 7.

In the case of a second variant, only one transmitter can be used in the sensor. In this event the two points 11 and 12 are measured one after the other in time. Once more, the housing is fixed and the light beam first is directed to the one point, and the coordinates are memorized of the photosensitive point which is illuminated in the sensor field 3. Subsequently the light beam is directed to the other point 12 and the second measuring operation is performed. The angle 13 then can be determined on the basis of the two measuring operations.

It is possible as well for the pattern generator 4 to be movable. If, for instance, the pattern generator includes a slit diaphragm, this diaphragm is moved once across the full range of displacement during each measurement. In this manner a defined irradiation of the sensor field is obtained for each measurement. The pattern 14 imaged in the sensor field 3 in this case might consist of two intersecting straight lines 14, their relative positions with respect to each other being an indication of the angle 13. This assembly is suitable for measuring both horizontal and vertical angles between two points.

Figure 4:
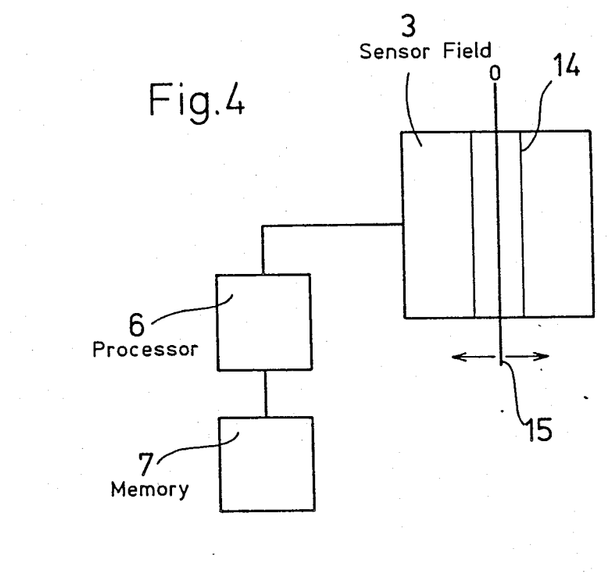
FIG. 4 is a diagrammatic sketch of the sensor when used to measure inclinations of objects with respect to the vertical.

FIG. 4 shows another embodiment of the invention, suitable for measuring inclinations or angles of objects with respect to the vertical. The pattern generator used in this case is a pendulum 15 which is irradiated directly by a light source. During measurement, the housing of the sensor is placed on or at the object to be measured, thus adopting the inclination thereof. The pendulum adjusts itself according to gravity so that the image or pattern 14 of the pendulum 15 in the sensor field 3 irradiates different photosensitive points in response to the inclination of the object to be measured. This then may be used to determine the inclination which is looked for. The transmitter can be located above the plane of the drawing and vertically transmitting the light beam.

The pendulum may be replaced by the magnetic needle of a magnetic compass acting as the pattern generator. In this event the magnetic needle is imaged in the sensor field 3.

What is obtained in this case is a magnetic compass.

According to another embodiment of the invention the optical element 5 may be suspended on gimbals for pendulating motion so that heights above a reference plane can be measured (a plane at the measuring location which plane is vertical to the perpendicular to the center of the earth). An optical sight means may be provided to measure angles of elevation of objects which are at such great distance that the light beam of the transmitter cannot illuminate them sufficiently. The measuring beam used in that event is a light beam which lies in the plane of the sight and is imaged directly in the sensor field 3 by way of the optical elements 5. An air sextant may be mentioned as a particular example of application hereof. If the objects are at a very great distance (such as stars), the parallax error introduced by the distance given as $l_2$ (FIG. 2) becomes negligibly small.

The sensor according to the invention is useful for carrying out the most diverse measurements. Preferred fields of application are: measuring distances or spacings, angles (whether horizontal or vertical), widths of objects if the distance from the object is known, heights with respect to a reference plane, inclinations with respect to the vertical, angles and directions based on Magnetic North. Furthermore, volumes of geometric bodies or profiles of the same can be measured as well as filling levels since these measurements, too, may be reduced to measurements of distances and angles.

It is sufficient for certain applications if the sensor field is one-dimensional, in other words if it has a series of photosensitive points. With other measurements, it is recommended to use a two- or multi-dimensional sensor field. A sensor field comprising, for example, three dimensions may be produced by arranging a plurality of planar sensor fields with respect to one another in space such that, for instance, a "dome" is obtained. This permits the whole area to be "scanned" in cooperation with a moving pattern generator, and the desired measuring results are obtained, for example, by way of the focussing or width of the light spot imaged in the sensor field.

It should be stressed in this context that the result of the measurement depends solely on the irradiated measurable points of the sensor field so that even if the pattern generator is moved or the optical elements are moved, their respective position need not be sampled.

The pattern generator may image any desired kind of patterns and is not limited to a certain optical system or certain forms of diaphragms. The pattern generator serves the primary purpose of transforming the "image" which is passed on by the optical elements in such manner that it will become especially adequate to be evaluated. And it makes no difference whether it is reduced to a dot or a fine line or even to an ellipse or a circle. In the latter case, for instance, the location of the center of the circle or of the major axes of the ellipse as well as the length of the major axes of the ellipses or the radius of the circle permit conclusions to be drawn as to the measurement result.

Figure 5:
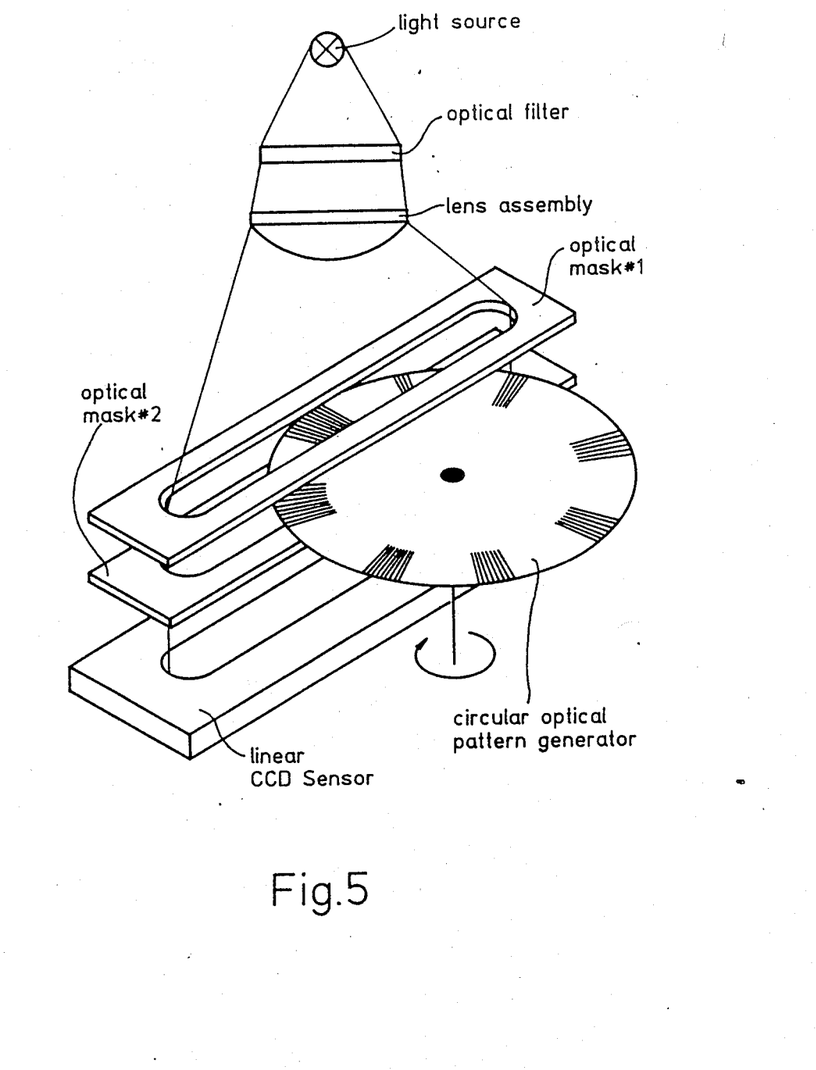
FIG. 5 shows a schematic perspective view of a basic angular encoder.
Figure 6:
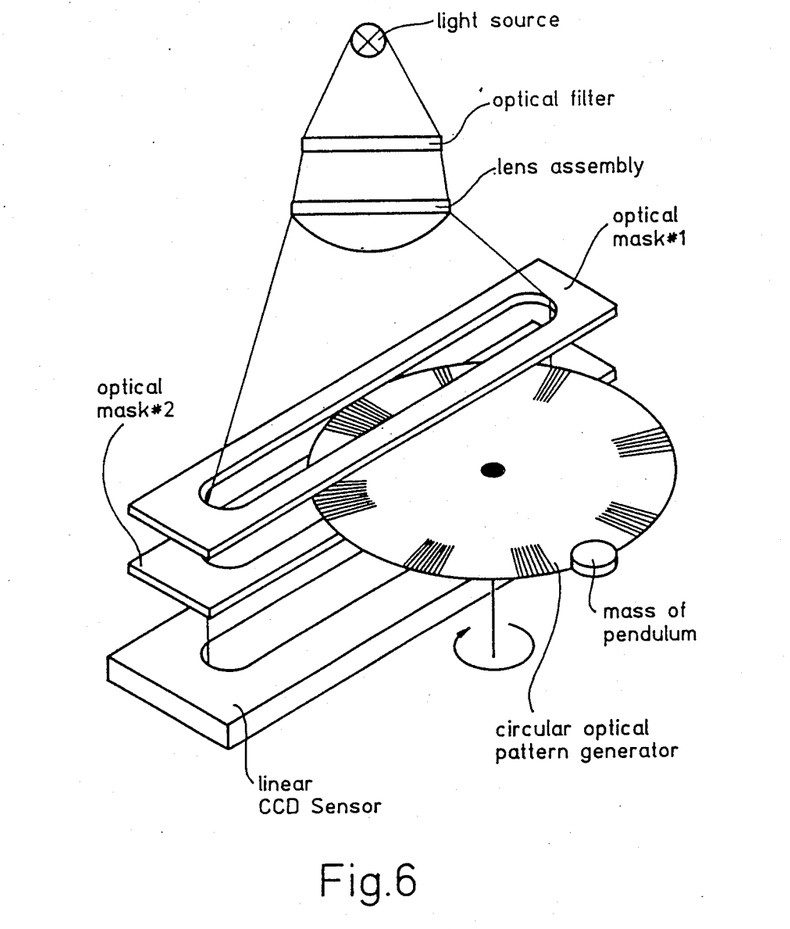
FIG. 6 shows a schematic perspective view of an angular encoder used as inclinometer.
Figure 7:
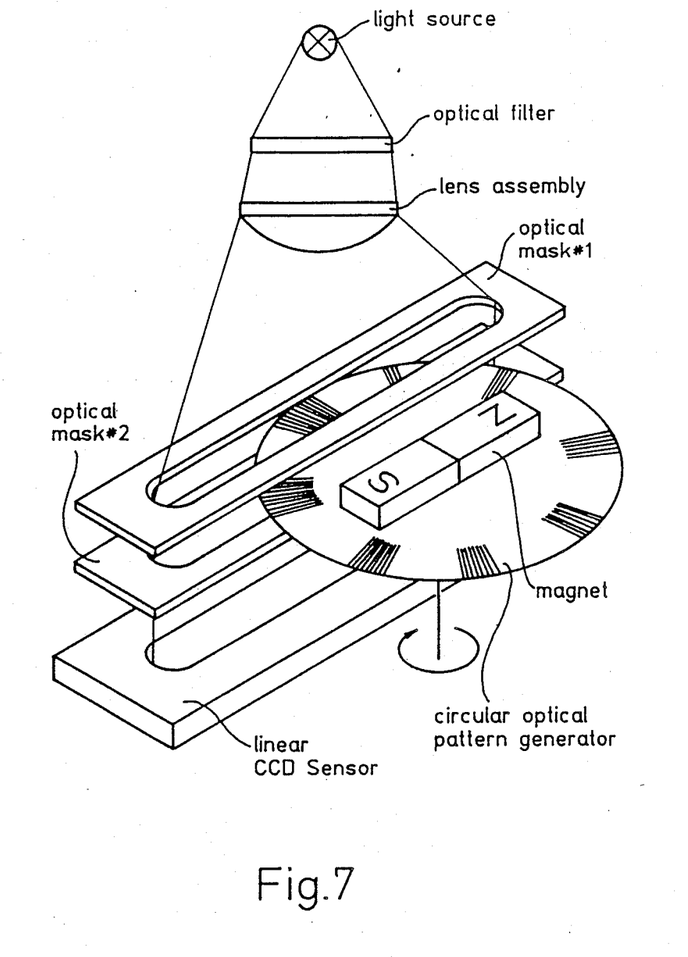
FIG. 7 is a schematic perspective view of an angular encoder used as precision compass.
Figure 8:
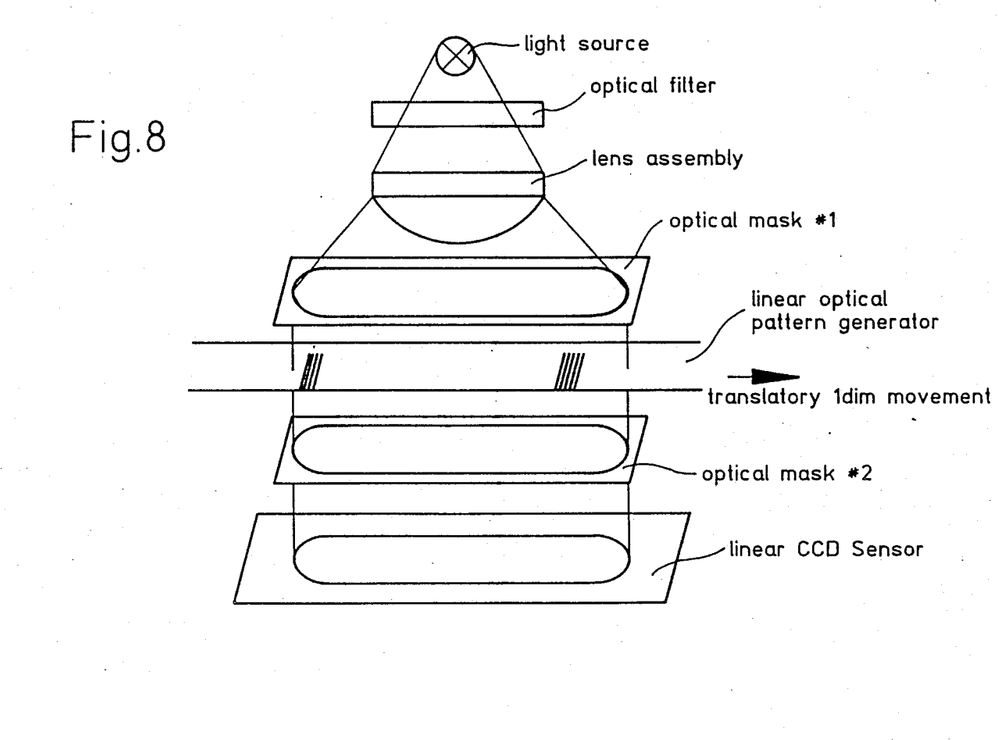
FIG. 8 is a schematic perspective view of a basic linear encoder.

FIG. 5 shows a basic angular encoder with a circular optical pattern generator and an optical filter; FIG. 6 shows an angular encoder used as an inclinometer; FIG. 7 shows an angular encoder used as a precision compass and FIG. 8 shows a basic linear encoder.

Any technical detail presented in the claims, specification, and drawings may be essential of the invention, both individually or in any desired combination.

What is claimed is:

1. A sensor with integrated signal processing, comprising housing means; at least one radiation source arranged inside said housing means; said radiation source directing a beam to an object at which said beam is reflected; optical elements spaced from said radiation source at a determined distance and receiving said reflected beam; a pattern generator, said reflected beam being directed to said pattern generator by said optical elements; a sensor field, said beam being passed on from said pattern generator to said sensor field; and evaluation means, said sensor field including a plurality of distinguishable, measurable points, said evaluation means being connected to said sensor field and determining a desired measurement variable in response to an electrical state of the measurable points, wherein said pattern generator is arranged to be displaceable with respect to said sensor field for one of translatory movement in parallel with a plane of the sensor field and rotation movement, said pattern generator being constructed as a pendulum for inclination measurement, and said radiation source being adapted to directly irradiate the pendulum, wherein the inclination of the housing means with respect to the pendulum is measured.

2. The sensor as claimed in claim 1, wherein the optical elements include filters which are tuned to the radiation of the radiation source.

3. The sensor as claimed in claim 1, wherein said pattern generator includes an optical system.

4. The sensor as claimed in claim 1, wherein said pattern generator includes a diaphragm.

5. The sensor as claimed in claim 1, wherein said sensor field contains the measurable points in a two-dimensional arrangement.

6. The sensor as claimed in claim 5, wherein said pattern generator is aligned with respect to said sensor field in such a manner that the pattern imaged on said sensor field covers at least one measurable point each in each of main axes (X, Y) of said sensor field.

7. The sensor as claimed in claim 1, wherein said sensor field contains the measurable points in a multi-dimensional arrangement.

8. The sensor as claimed in claim 1, wherein said sensor field is formed as a CCD-array.

9. The sensor as claimed in claim 1, wherein one radiation source is arranged so as to be pivotable with respect to said housing means.

10. The sensor as claimed in claim 1, wherein said optical elements are suspended for pendulating motion.

11. The sensor as claimed in claim 1, wherein said pattern generator is suspended for pendulating motion.

12. A sensor with integrated signal processing, comprising housing means; at least one radiation source arranged inside said housing means; said radiation source directing a beam to an object at which said beam is reflected; optical elements spaced from said radiation source at a determined distance and receiving said reflected beam; a pattern generator, said reflected beam being directed to said pattern generator by said optical elements; a sensor field, said beam being passed on from said pattern generator to said sensor field; and evaluation means, said sensor field including a plurality of distinguishable, measurable points, said evaluation means being connected to said sensor field and determining a desired measurement variable in response to an electrical state of the measurable points, wherein said pattern generator is arranged to be displaceable with respect to said sensor field for one of translatory movement in parallel with a plane of the sensor field and rotation movement, wherein said pattern generator is a rotatably supported magnetic needle of a magnetic compass.

13. The sensor as claimed in claim 12, wherein said pattern generator is constructed such that a light spot imaged by said optical elements is transformed into another pattern which is imaged on said sensor field.

14. A sensor with integrated signal processing, comprising housing means; at least one radiation source arranged inside said housing means; said radiation source directing a beam to an object at which said beam is reflected; optical elements spaced from said radiation source at a determined distance and receiving said reflected beam; a pattern generator, said reflected beam being directed to said pattern generator by said optical elements; a sensor field, said beam being passed on from said pattern generator to said sensor field; and evaluation means, said sensor field including a plurality of distinguishable, measurable points, said evaluation means being connected to said sensor field and determining a desired measurement variable in response to an electrical state of the measurable points, wherein said pattern generator is arranged to be displaceable with respect to said sensor field for one of translatory movement in parallel with a plane of the sensor field and rotation movement, wherein a plurality of radiation sources are arranged in said housing means so as to be pivotable with respect to one another.

15. A sensor with integrated signal processing, comprising housing means, a radiation source arranged inside said housing means, said radiation source directing a beam to an object at which said beam is reflected; optical elements located at a determined distance from said radiation source; a pattern generator, said reflected beam being directed to said pattern generator by said optical elements; a sensor field, said beam being passed on from said pattern generator to said sensor field; and evaluation means, said sensor field including an array of distinguishable, measurable points, said evaluation means being connected to the sensor field and determining a desired measurement variable in response to an electrical state of the measurable points, wherein said pattern generator is constructed such that a light spot imaged by said optical elements is transformed into at least one fine line which is imaged obliquely on said sensor field to thereby enhance the capability of resolution by a factor depending on a number of rows in said array.

* * * * *